United States Patent

[11] 3,598,062

| [72] | Inventor | Edward Weinstein<br>20310 Clark St., Woodland Hills, Calif.<br>91364 |
|---|---|---|
| [21] | Appl No | 830,937 |
| [22] | Filed | June 6, 1969 |
| [45] | Patented | Aug. 10, 1971 |

[54] FOOD PRODUCT SCOOPER
5 Claims, 7 Drawing Figs.

| [52] | U.S. Cl. | 107/48 H |
|---|---|---|
| [51] | Int. Cl. | A47j 43/28 |
| [50] | Field of Search | 107/48 |

[56] References Cited
UNITED STATES PATENTS

| 2,439,125 | 4/1948 | Bolinger | 107/48 |
| 2,571,729 | 10/1951 | Lawrence et al. | 107/48 |
| 2,714,862 | 8/1955 | Gargano | 107/48 |
| 3,421,456 | 1/1969 | Weinstein | 107/48 |

*Primary Examiner*—Louis K. Rimrodt
*Attorney*—Roger A. Marrs

ABSTRACT: A powered scooper is disclosed having a tubular handle enclosing an electric motor for rotatably driving a bowl member mounted on the extreme end of the handle. A gear train is provided comprising a pinion gear driven by the drive shaft of the motor which is engaged with a ring gear carried about the midsection of the bowl. The circular periphery of the bowl is formed with a cutting edge adapted to separate a portion of the food bulk from its surrounding bulk.

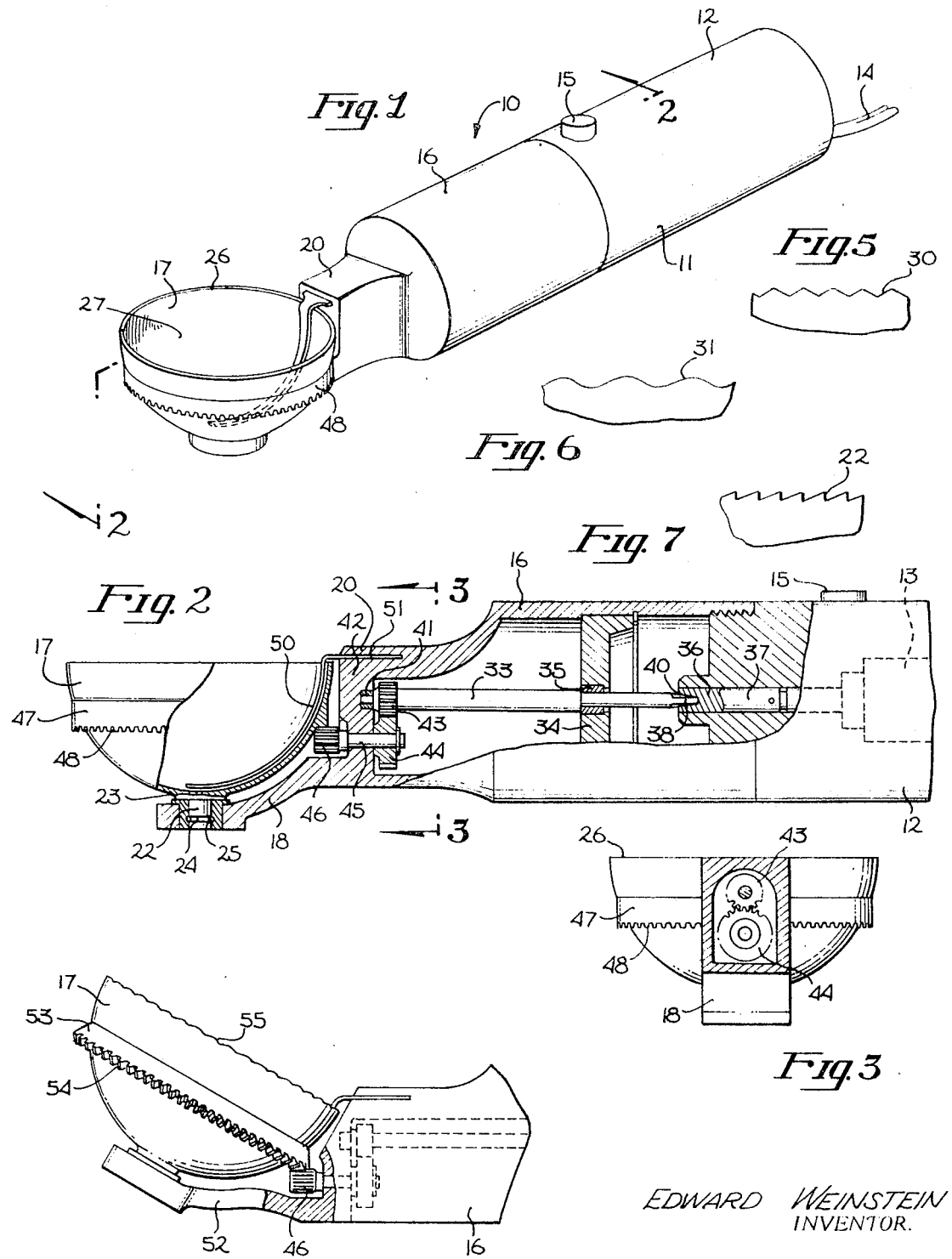

FOOD PRODUCT SCOOPER

BACKGROUND OF THE INVENTION

1. Field of the Invention

This invention relates to food product dispensing equipment and, more particularly, to a novel hand-held powered scooper for effecting the removal of a quantity of food product from its surrounding bulk stored in a container.

2. Description of the Prior Art

In the food products industry, it is the customary practice to store quantities of frozen food products, such as ice cream, for example, in cylindrical containers designed to hold approximately 1 gallon of the food product. The containers are generally stored in large refrigeration units so that the food product not only is maintained fresh but becomes hard. At such subsequent time that the containers of hardened frozen food product are delivered to commercial food stores, restaurants, ice cream parlors or the like, the problem is encountered of removing the frozen food product from its container so that the product may be dispensed to the consumer in a dish, confectionary cone, glass, etc.

To effect the removal of such hardened food product from its container, a variety of hand implements have been employed which are physically forced and manipulated into the food product by the sheer muscular action of the user so that a portion of the product is separated from the bulk and subsequently dispensed in accordance with the user's requirement. Some prior implements such as spades and scoopers employ thermal means for assisting in accomplishing removal of the product while others often employ sharply tapered peripheral edges formed on the bowl member of the scooper or spade to separate the desired portion of the product from the bulk. However, difficulties and problems have been encountered when employing these conventional implements which stem largely from the fact that physical effort is required by the user to forcibly urge the scooper bowl member or spade edge into and through the product material. Generally, extensive manipulation of the implement is required by the user. Such a requirement is extremely tiring, especially if repeated product removing procedures are experienced, and generally, the arm muscles of the user are greatly taxed. This is a great restriction to certain persons such as children and food industry workers who are compelled to use these conventional implements.

One attempt to overcome the above difficulties resides in the disclosure of U.S. Letters Pat. No. 3,421,456 which provides a powered scooper incorporating a rotating bowl having an annular peripheral edge in driving engagement with the pinion gear of a powered drive train. The edge serves as a ring gear and therefore, the design and configuration of the gear teeth must be compatible with those of the pinion gear. This restricts the edge from being formed with a curvilinear cutting edge, sawteeth, scalloped teeth or other configured edges more suitable for separating a variety of food products than conventional gear teeth.

SUMMARY OF THE INVENTION

Accordingly, the problems encountered by prior powered scooper dispensing implements are obviated by providing an electrical power source for rotating a scooper bowl member having a regular or irregular annular peripheral edge which cuttingly engages with the desired portion of the food product to be separated from the surrounding bulk material. The power source is pushbutton operated so that the bowl rotation is under control of finger operation by the user so that regardless of how firm or hard the food product is packed, the powered bowl member will effect separation.

In one embodiment of the present invention, the powered scooper comprises a tubular handle for housing a small electric motor which is operably connected to an elongated drive shaft rotatably carried by a body portion detachably coupled to one end of the handle. The body portion includes a cantilevered arcuate section on which a bowl member is rotatably mounted. The bowl member is formed with a plurality of gear teeth constituting a ring gear about its midsection on the exterior surface of the bowl member. A pinion gear is fixed on the end of the drive shaft which meshes with the ring gear for imparting rotary movement to the bowl member from the motor and drive shaft. The annular peripheral edge of the bowl defines an open cavity into which the separated food product is positioned. Since the peripheral edge of the bowl member is not in the drive train, the edge may be suitably configured to provide a cutting edge compatible with the intended product to be separated.

Furthermore, the bowl member is detachably carried on the end of the cantilevered arcuate section which includes a snapring arrangement adapted to retain the bowl member on the arcuate section during handling and operation of the scooper.

Therefore, it is among the primary objects of the present invention to provide a novel powered scooper having a ring gear located about the midsection of a rotatable bowl member which is operably driven by an electric motor.

Another object of the present invention is to provide a novel powered scooper for effecting the removal of a portion of frozen food product having a rotary bowl member formed with a plurality of teeth about its peripheral edge and incorporating a drive means located on the exterior surface thereof midway between its opposite ends in driving communication with an electric motor.

Still a further object of the present invention is to provide a novel powered scoop having a detachable bowl member carried on an elongated tubular handle which incorporates a snap-lock action for retention and removal purposes.

A further object of the present invention resides in providing a cutting edge along the annular peripheral edge of the rotatable bowl member which may take many forms of regular or irregular cutter configurations.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the novel powered scooper incorporating the present invention showing the bowl member drive means disposed midway between its opposite ends;

FIG. 2 is a longitudinal cross-sectional view of a powered scooper illustrated in FIG. 1 as taken in the direction of arrows 2-2 thereof;

FIG. 3 is a transverse cross-sectional view of the powered scooper as taken in the direction of arrows 3-3 of FIG. 2;

FIG. 4 is an enlarged side elevational view of another embodiment of the present invention illustrating the peripheral cutting edge of the bowl member canted with respect to the longitudinal axis of the device; and FIGS. 5—7 inclusive are enlarged fragmentary views of the bowl member cutting edge illustrating a variety of configurations.

DESCRIPTION OF THE PREFERRED EMBODIMENT

Referring to FIGS. 1 and 2, the novel powered scooper of the present invention is illustrated in the general direction of arrow 10. The embodiment illustrated includes a cylindrical hollow handle 11, preferably composed of plastic material, which is adapted to be held in the hand of the user and may include a plurality of spaced indentations about which the fingers of the user's hand may be conveniently disposed. Handle 11 is tubular in cross section and includes a rear section 12 for housing an electrical motor 13 which may be of any conventional type that may be energized by either means of storage batteries or via a power cable 14 adapted to be plugged into a conventional wall socket. A pushbutton 15 is preferably carried on the upper side of the handle section 12 in a convenient position for thumb operation so that the electrical motor may be started and stopped upon the depression and release of the button, respectively.

Handle 11 further includes a forward portion 16 functioning as a coextension of the rear portion 12 which is in threadable engagement with portion 12 so as to be readily separated therefrom when desired. The forward handle portion 16 is employed for housing the drive train operably interconnecting the motor 13 with a rotatable bowl member 17.

The outwardly extending free end of the body portion 16 is integrally formed with an arcuate section 18 which extends downwardly from an upper surface 20 of the body portion 16. Near the end of the arcuate section 18, a bearing means 21 is situated so as to rotatably receive and mount the bowl member 17. Bowl member 17 includes a fixed shaft 22 which is rotatably seated in the bearing 21 wherein the outer surface of the bowl member surrounding shaft 22 is spaced apart from the bearing by means of a washer 23. The shaft 22 includes a groove of reduced diameter indicated at numeral 24 which receives an expandable resilient ring 25. The ring 25 is arranged to normally expand outwardly into a mating groove formed in the inside bore wall of the bearing 21. Therefore, it can be seen that a snap action is produced which detachably secures or connects the bowl member 17 to the arcuate portion 18. By this construction, the bowl member may freely rotate on the bearing as supported on the arcuate section The bowl member is further provided with a cutting edge 26 which is formed on the annular peripheral edge of the bowl member defining an opening into a cavity 27. The cutting edge 26 serves to sever or separate the food product to be removed from its surrounding bulk. The cutting edge is adapted to engage the food product when the scooper is forced into the food product material so that a portion of material seats within the cavity 27 as the bowl member rotates.

As illustrated in FIG. 1, the cutting edge 26 is curvilinear so as to be regular and flat. However, it is to be understood that a feature of the present invention resides in the fact that the cutting edge may take the form of an irregular cutter, such as shown in FIGS. 5, 6 and 7, respectively. The cutting edge may be configured to include wedge teeth 30, scalloped cutting edge 31 or a sawtooth configuration 32.

To rotatably drive the bowl member 17, means are provided which comprise a drive shaft 33 rotatably carried on a mount 34 in a suitable bearing 35. One end of the drive shaft is adapted to be received into a chuck member 36 carried on the end of an armature shaft 37 forming a part of motor 13. Preferably, the drive shaft 33 includes a tongue 38 which is adapted to be insertably received within a chuck slot 40 of the chuck 36. The opposite end of the drive shaft is rotatably retained in a bearing 41 carried on a forward wall 42 of the handle portion 16. This latter end of the drive shaft fixedly carries a drive gear 43 meshed with a transfer gear 44 carried on the end of an intermediate shaft 45. The shaft 45 is rotatably carried on the forward wall 42 and includes a pinion gear 46 carried on its end exteriorly of the handle adjacent bowl member 17. The bowl member 17 is provided with a circular gear 47 located midway between its opposite ends. The gear 47 includes a plurality of integrally formed teeth 48 which are meshed with the teeth of pinion gear 46 in driving relationship therewith so that the gear 47 constitutes a ring gear. Consequently, when the pushbutton 15 is depressed, the electric motor will cause rotation of shaft 33 and the bowl member 17 will rotate via the gear train composed of pinion gear 40 and ring gear 47.

Although the gear teeth 48 are shown on the underside of the gear, it is to be understood that the gear teeth may also be formed on the upper edge or side of the gear 47 so that the teeth would then engage with the underside of pinion 46. In this latter instance, it would not be necessary to include the snapring or lock 25 since the engagement of the pinion 46 with the upper teeth of gear 47 would retain the bowl member in its position on bearing 21.

The powered scooper of the present invention also includes an arcuate stripper blade 50 having a curvature corresponding to the contour of the hemispheric inner surface of bowl member 17. The stripper blade downwardly depends into the cavity 27 of the bowl member in close proximity to the inner surface thereof from the forward wall 42. The forward wall is formed with a slot adapted to insertably receive a base member 51 of the stripper blade for mounting purposes. The stripper blade may be readily disassembled from the scooper by urging the base portion 51 out of its slot.

Referring now to FIG. 4, another embodiment of the present invention is shown wherein the handle portion 16 terminates in an extension 52 adapted to rotatably mount the bowl member 17 at a tilting or canted angle. The bowl member is provided with a ring gear 53 about its midsection having a plurality of integral teeth 54 in mesh with pinion gear 46. However, because of the angle of the cutting edge 55 with respect to the longitudinal axis of the handle, the ring gear 56 takes the form of a bevel gear in which the teeth 54 are angularly disposed with respect to the sidewall of the bowl member. Also, in this embodiment, the cutting edge 55 takes the form of a shallow scalloped edge having irregular projections and depressions alternately formed about the annular peripheral edge. The cutting edge or teeth are similar to the scalloped teeth or edge 31 shown in FIG. 6. For removing a portion of food product from certain varieties of food, it is more convenient to provide that the axis of bowl rotation be at an angle with respect to the longitudinal axis of the handle.

In view of the foregoing, it can be seen that the powered scooper of the present invention provides a novel means for removing a portion of frozen or relatively hard food product from its surrounding bulk material. The removal is achieved without undue physical exertion by the user due to the fact that the cutting edge of the bowl member adequately severs the material as the bowl is rotated. A variety of cutting teeth may be formed on the cutting edge since the ring gear 47 is located away from the proximity of the cutting edge. Removal of the captured portion of the food product from the bowl member is also effected by the rotation thereof in cooperation with the stripper blade 50 so that the food product may be readily dispensed from the powered scooper. Assembly and disassembly of the various moving parts of the scooper is available which permits the device to be taken apart for repair, maintenance and cleaning purposes.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What I claim is:

1. A powered food product scooper adapted to remove a portion of relatively hard food product from the bulk of the surrounding food product comprising:
   a tubular handle enclosing an electric motor carried therein;
   a rotatable bowl member having an annular peripheral cutting edge;
   a body portion outwardly depending from one end of said handle including an extended section cantilevered from the free end thereof;
   means cooperatively disposed between said bowl member and said extended portion for detachably retaining said bowl member thereon;
   a ring gear carried on said bowl member substantially midway between its opposite ends;
   means operably coupling said electric motor to said ring gear for imparting a moving force to rotate said bowl member in response to operation of said electric motor whereby said cutting edge engages with the food product portion desired to be removed;
   an arcuate stripper blade having one end thereof detachably carried on the free end of said body portion and disposed to extend over said cutting edge of said bowl member into the cavity thereof in close proximity to the inner surface of said bowl member;

said cutting edge being a continuous, substantially smooth edge; and said means for detachably retaining said bowl member to said extended section comprising an expandable snapring carried on a bowl member shaft and a groove formed in said extended section adapted to partially receive said snapring when said shaft is carried on said extended section.

2. The invention as defined in claim 1 wherein
said extended section is arcuate conforming substantially to the curvature of said bowl member.

3. The invention as defined in claim 2 wherein
said ring gear includes a plurality of gear teeth opening downwardly and said operable means connecting said electric motor to said bowl member includes a drive shaft rotatably carried on said body portion having one end thereof coupled to said electric motor and provided with a pinion gear on its other end drivingly engageable with said downwardly depending ring gear teeth.

4. The invention as defined in claim 1 wherein
said extended portion is substantially flat having an inclined end whereby the bowl member axis of rotation is angularly disposed with respect to the central longitudinal axis of said handle.

5. The invention as defined in claim 4 wherein the teeth of said ring gear are beveled.